United States Patent [19]

Christiaens et al.

[11] Patent Number: 4,920,294
[45] Date of Patent: Apr. 24, 1990

[54] SYNCHRONOUS OR STEPPING MOTOR WITH SIMPLIFIED TOOTH ALIGNMENT

[75] Inventors: Aloïs E. Christiaens, Liedekerke; Leon G. G. Lebon, Waterloo, both of Belgium

[73] Assignee: U.S. Philips Corporation, New York, N.Y.

[21] Appl. No.: 361,787

[22] Filed: May 30, 1989

Related U.S. Application Data

[63] Continuation of Ser. No. 212,133, Jun. 27, 1988, abandoned, which is a continuation of Ser. No. 894,438, Jul. 30, 1986, abandoned, which is a continuation of Ser. No. 672,023, Nov. 16, 1984, abandoned.

[30] Foreign Application Priority Data

Aug. 20, 1984 [NL] Netherlands .................... 8402542

[51] Int. Cl.⁵ ............................................ H02K 37/12
[52] U.S. Cl. ................................. 310/162; 310/49 R
[58] Field of Search ............................... 310/162, 149

[56] References Cited

U.S. PATENT DOCUMENTS

| | | | |
|---|---|---|---|
| 3,206,623 | 9/1965 | Snowdon | 310/162 |
| 3,401,322 | 9/1968 | O'Regan | 310/49 X |
| 4,127,802 | 11/1978 | Johnson | 310/114 X |
| 4,206,374 | 6/1980 | Goddijn | 310/114 X |
| 4,255,696 | 3/1981 | Field, II | 310/49 X |
| 4,264,833 | 4/1981 | Stenudd | 310/114 X |
| 4,306,164 | 12/1981 | Itoh et al. | 310/49 |
| 4,638,195 | 1/1987 | Lin | 310/49 |

FOREIGN PATENT DOCUMENTS

| | | |
|---|---|---|
| 57-88863 | 6/1982 | Japan . |
| 518298 | 2/1940 | United Kingdom . |
| 641243 | 8/1950 | United Kingdom . |
| 642477 | 9/1950 | United Kingdom . |
| 959502 | 6/1964 | United Kingdom . |

Primary Examiner—Peter S. Wong
Assistant Examiner—D. L. Rebsch
Attorney, Agent, or Firm—David R. Treacy; Brian J. Wieghaus

[57] ABSTRACT

A hybrid stepping motor comprises a stator with two annular coils, which each cooperate with two sets of stator teeth, and a rotor with two rotor sections which are separated by an axially magnetized magnet. These rotor sections each comprise two sets of rotor teeth which each cooperate with one of said sets of stator teeth. The various tooth offsets in this motor are obtained by providing an offset of ½ tooth pitch for each annular coil and by providing an offset of ¼ tooth pitch between the two rotor sections.

26 Claims, 2 Drawing Sheets

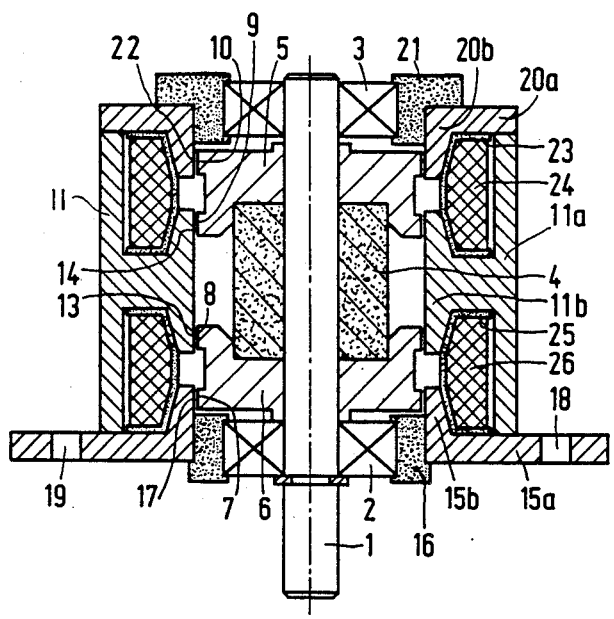
FIG.1
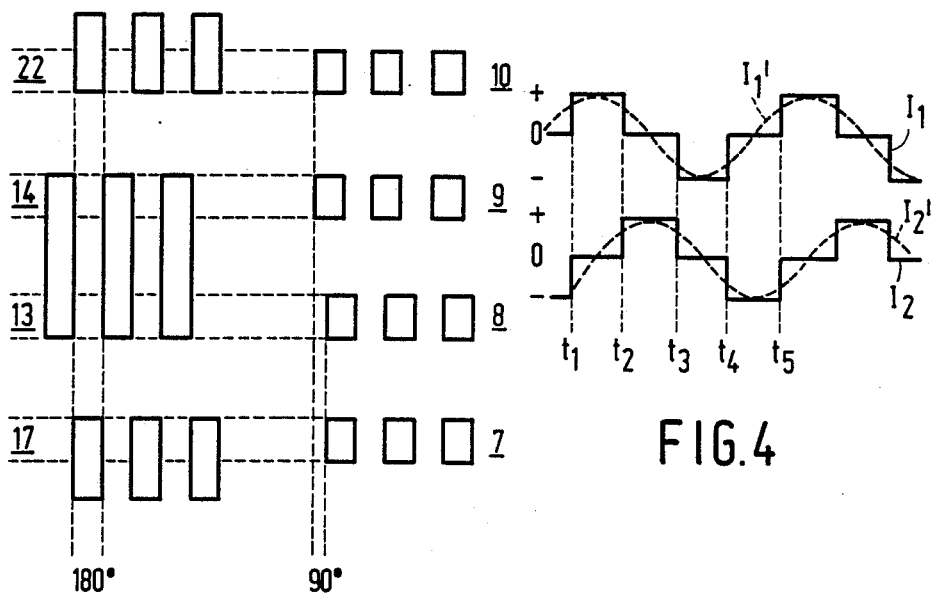
FIG.3
FIG.4

SYNCHRONOUS OR STEPPING MOTOR WITH SIMPLIFIED TOOTH ALIGNMENT

This is a continuation of application Ser. No. 212,133, filed June 27, 1988 which is a continuation of application Ser. No. 894,438 filed on July 30, 1986 which is a continuation of application Ser. No. 672,023, filed on Nov. 16, 1984, all now abandoned.

BACKGROUND OF THE INVENTION

The invention relates to a synchronous motor comprising a stator and a rotor rotor; and more particularly to a motor whose rotor comprises two coaxial rotor sections which are each provided with rotor teeth at the outer circumference, the teeth being arranged along a circle and being axially spaced by an interposed axially magnetized permanent magnet. The stator comprises two coaxial stator sections which are interconnected in a magnetically conductive fashion and which are each provided with at least one coaxial annular coil which is enclosed by a magnetically conductive circuit which comprises a rotor section and the stator section which surrounds the relevant annular coil. Each stator section terminates in two sets of coaxially arranged stator teeth which cooperate with the rotor teeth via air gaps, one of said sets of stator teeth being oriented towards the cooperating rotor teeth and the other sets of stator teeth being offset from the cooperating rotor teeth by substantially ¼, ½ and ¾ tooth pitch in such a way that a difference in offset of ½ tooth pitch is obtained between the stator sections.

Such a synchronous motor, which may be constructed as a stepping motor, is of the hybrid type and is described, for example, in U.S. Pat. No. 4,206,374. In the motor described therein the magnet is situated in the stator, but it is stated that this magnet may alternately be arranged in the rotor. The various tooth offsets in said motor are obtained by arranging the stator teeth at positions which are situated 0, ½, ¼ and ¾ tooth pitch from each other and arranging the rotor teeth in line. In a version of the motor which is marketed by N. V. Philips' Gloeilampenfabrieken and which is described in Philips Data Handbook Components and Materials, Book C17, Stepping motors and associated electronics, 1984, pages 8 and 9, the offset is obtained by arranging the rotor teeth at positions which are situated 0, ½, ¼ and ¾ tooth pitch from each other and arranging the stator teeth in line.

Such a stepping motor has the disadvantage that in the stator five different parts must be interconnected, namely two parts per stator section (to allow the coils to be mounted) with a permanent magnet interposed between these stator sections, which leads to a weak construction. Moreover, the alignment of the four different tooth positions is sometimes an intricate operation. In the case of 50 teeth per revolution the stepping angle is 1.8°. A stepping-angle accuracy of, for example, 3% then demands an alignment accuracy of approximately 3 minutes of arc. In the commercially available motor the latter problem has been solved by providing the tooth offset on the rotor and forming the rotor teeth in four rings on said rotor, the rotor being rotated through ¼ tooth pitch every time. However, this requires a specific axial clearance between these four sets of teeth, which clearance becomes too small when the motor dimensions are reduced. The rotor must then be assembled from four separate parts which, apart from the weak construction, has the disadvantage that four parts must be secured to each other at four different angles with the said accuracy.

SUMMARY OF THE INVENTION

The invention aims at providing a motor of the type defined in the opening paragraph, which has a more robust construction and smaller dimensions but is easier to align. In accordance with the invention, the teeth of both sets of a stator section are given an offset of ½ tooth pitch relative to each other and the two rotor sections are given an offset of ¼ tooth pitch relative to each other.

By thus dividing the various tooth offsets between the rotor and the stator, the tooth offsets exist only between those elements which in any event have to be assembled from different parts during manufacture. Indeed, the sets of a stator section, between which an offset of ½ tooth pitch is required, must be assembled from separate parts to allow the annular coil to be mounted; and the two rotor sections, between which an offset of ¼ tooth pitch is required, are separated by the permanent magnet. This results in a more robust construction because the stator and the rotor can each be assembled from three parts, and a simpler alignment because only one angle must be aligned for each component (stator and rotor). The sets of teeth of each individual rotor section are formed in a single one-piece magnetic part and not offset relative to each other and can therefore be machined in one operation despite the smaller axial clearance.

Further, it is advantageous in the motor in accordance with the invention, if the axially adjacent sets of stator teeth of the two stator sections are formed by one common set of stator teeth which extend between the two rotor sections without axial clearance between the teeth of the two sets. This enables the stator sections of the inner sets of stator teeth to be formed also in one operation.

With respect to the permanent magnet in the rotor it is advantageous if those sides of the two rotor sections which face the permanent magnet are formed with recesses which receive the permanent magnet.

As a result of this, the torque produced by the motor can be very symmetrical.

For a simpler and more rugged construction it is also advantageous if the two outer sets of stator teeth are arranged on parts which axially bond the stator and which at the inner circumference are formed with substantially cylindrical inner surfaces on which said outer sets of stator teeth are arranged. These inner surfaces project axially from the two rotor sections, and the rotor provided with a shaft which is journalled by means of bearings in the inner surfaces which project from the rotor sections.

In this way it is not necessary to use extra end plates in the stator for carrying the bearings, so that the number of stator parts is limited to three.

The invention will be described in more detail, by way of example, with reference to the drawings.

BRIEF DESCRIPTION OF THE DRAWING

FIG. 1 is an axial sectional view of a preferred embodiment of the invention,

FIG. 3 is a diagram illustrating the arrangement of the teeth in the motor in accordance with the invention, and FIG. 4 is a diagram in which energizing currents which may be used in the motor shown in FIGS. 1 and 2 are plotted as a function of time.

DESCRIPTION OF THE PREFERRED EMBODIMENT

Figure 2:
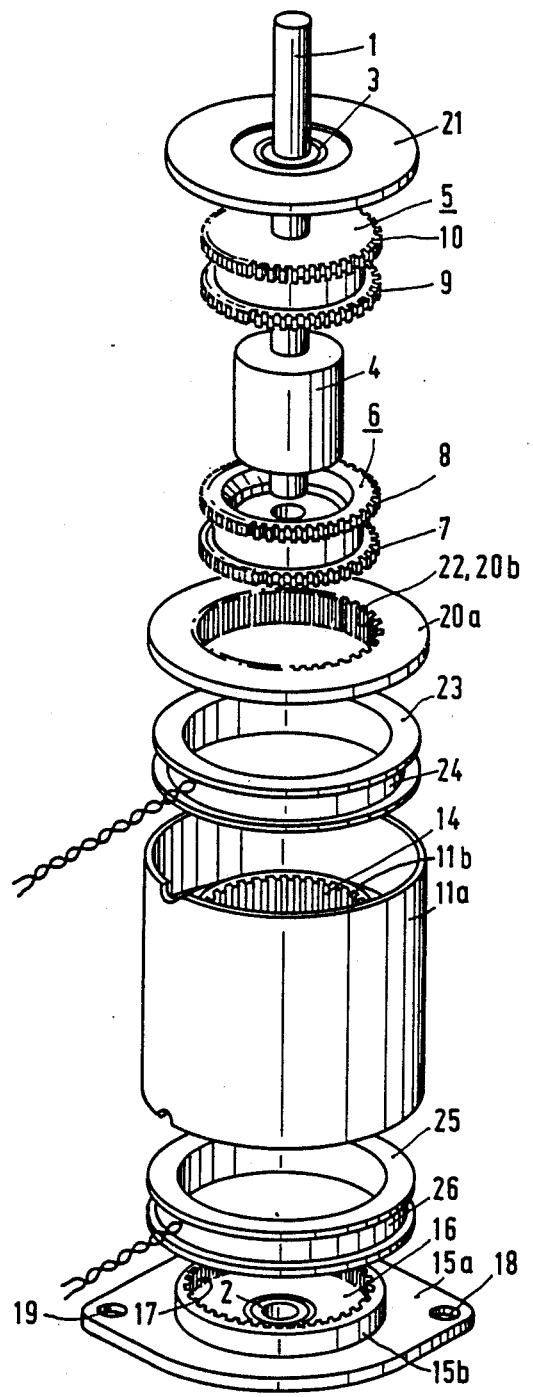
FIG. 2 is an exploded view of the motor shown in FIG. 1.

FIG. 1 is an axial sectional view of a motor in accordance with the invention, and FIG. 2 is an exploded view of this motor. The motor comprises a rotor with a shaft 1 mounted in a lower bearing 2 and an upper bearing 2. An axially magnetized cylindrical permanent magnet 4 is mounted on the rotor shaft 1 between two rotor sections 5 and 6. The rotor section 5, 6 each comprises a cylindrical member which terminates in two sets of rotor teeth 7, 8 and 9, 10 respectively. The cylindrical members of the sections 5 and 6 have recesses for receiving the permanent magnet 4 in order to ensure that the flux division from the axial end faces of this magnet to each of the sets of teeth 7, 8 and 9, 10 is the same.

The stator comprises a tooth and sleeve part 11 having a substantially cylindrical center portion 11a and a cylindrical inner portion 11b of smaller diameter. At least at the location of the rotor teeth 8, 9 respectively, the stator is provided with stator teeth 13 and 14 which in this example constitute one set of teeth which extend in the axial direction on the portion 11b. At the lower end the cylindrical part 11 is closed by a stator section which comprises a substantially flat annular portion 15a which is connected to a cylindrical portion 15b. The portion 15b is formed with stator teeth at least at the location of the rotor teeth, and carries the lower bearing 2 via a plastic body 16. These stator teeth extend up to the axial end surface of the portion 15a, to carry the plastic body 16 which may be formed for example by injection-molding. The plastic body may be extended to fill the gaps between the teeth 17. The annular portion 15a is locally wider than the cylindrical portion 11a to provide room for the mounting holes 18 and 19. At the upper end the tooth and sleeve part 11 is closed by a stator section comprising a substantially annular portion 20a and a cylindrical portion 20b which carries the bearing 3 via a plastic body 21. At least at the location of the rotor teeth 10, the portion 20b is formed with stator teeth 22, the stator teeth in the present example extending into the plastic body 21 to enable the bearing to be arranged concentrically with these teeth.

The upper half of the tooth and sleeve part 11 together with the portions 20a and 20b bounds a space which accommodates an annular coil 24 mounted on a support 23, the iron portions 11b, 11a, 20a, 20b and the rotor body 5 constituting a magnetic circuit which includes the teeth 22, 10, 9 and 14 and which surrounds the annular coil 24. In a similar way the lower half of the part 11 together with the portions 15a, 15b and 11b bound a space which accommodates an annular coil 26 mounted on a support 25, the iron portions 11b, 11a, 15a, 15b and the rotor body 6 constituting a magnetic circuit which includes the teeth 13, 8, 7 and 17 and which surrounds the annular coil 26.

FIG. 3 illustrates the angles between the various stator and rotor teeth. The stator teeth 22 have an offset of 180° electrical, that is, half a tooth pitch, relative to the stator teeth 14 which are arranged in line with the stator teeth 13. The stator teeth 17 have an offset of 180° electrical relative to the stator teeth 13. The rotor teeth 10 and 9 as well as the rotor teeth 7 and 8 are arranged in line with each other and the teeth 8 have an offset of 90° electrical or ¼ tooth pitch relative to the rotor teeth 9. This ensures that when the rotor teeth 10 are situated opposite the stator teeth 22, the rotor teeth 9, 8 and 7 have an offset of 180°, 270° and 90°, respectively, or ½, ¾ and ¼ tooth pitch, respectively, relative to the stator teeth 14, 13 and 17, respectively.

The teeth 10 and 9, the teeth 8 and 7, as well as the teeth 14 and 13 are arranged in line with each other, so that they can be formed in one operation. The various angular offsets are provided between the teeth 22 and 14, the teeth 13 and 17, and the teeth 9 and 8, respectively. The associated parts must be separate parts to allow the annular coils 24 and 26 to be mounted between the parts 20 and 11 and between the parts 15 and 11, respectively, and to allow the permanent magnet to be mounted between the rotor sections 5 and 6. Thus, the various teeth are aligned relative to each other by aligning those parts which must be separate parts anyway.

In the present example the teeth 13 and 14 adjoin each other axially. However, they may be separated in the same way as the rotor teeth 9 and 10 and the rotor teeth 7 and 8. Conversely, the rotor teeth 9 and 10 as well as the rotor teeth 7 and 8 may be integral with each other.

FIG. 4 is an energizing diagram for the motor in accordance with the invention. In this diagram the curve $I_1$ represents the current through the coil 24 and the curve $I_2$ the current through the coil 25, the current being defined as a positive current (+) if the field is such that in the air gaps at the location of the stator teeth 22 and 17 it has the same orientation as the field of the permanent magnet 4. Between the instants $t_1$ and $t_2$ the current $I_1$ is positive ($I_2 = 0$). The permanent-magnet field in the air gap at the location of the stator teeth 22 is then amplified and that at the location of the stator teeth 14 is attenuated. As a result of this, the rotor teeth 10 will be oriented towards the stator teeth 22. Between the instants $t_2$ and $t_3$ the current $I_2$ is positive ($I_1 = 0$), so that the rotor teeth will be oriented towards the stator teeth 17 and the rotor is consequently rotated through 90° electrical or ¼ tooth pitch. Subsequently, the current $I_1$ becomes negative ($I_2 = 0$), thereby causing the rotor teeth 9 to be oriented towards the stator teeth 14 and the rotor to be rotated again through ¼ tooth pitch. Now the current $I_2$ becomes negative ($I_1 = 0$), so that the rotor teeth 8 are again oriented towards the stator teeth 13, which again results in a rotation of the rotor through ¼ tooth pitch. In this way the motor operates as a stepping motor. If instead of the pulse-shaped currents $I_1$ and $I_2$ a set of alternating currents $I_1'$ and $I_2'$ which are shifted 90° relative to each other is applied, the motor will operate as a synchronous motor.

In a practical version the motor in accordance with the invention has a tooth pitch equal to 7.2 geometrical degrees, corresponding to a stepping angle of 1.8° (¼ tooth pitch), so that the rotor completes one revolution in 200 steps.

This novel way of dividing the various angular offsets among the various teeth on the rotor and stator renders the alignment of the teeth less intricate because the teeth of those parts which need not be separable can be formed in one operation without angular offsets and because both for the stator and the rotor only one angular alignment is necessary (180° for the stator and 90° for the rotor). In addition the motor construction becomes more rugged because both the stator and the rotor are assembled from a minimal number of separable parts.

By arranging the permanent magnet 4 in recess in the rotor sections 5 and 6 the axial length is reduced and a correct magnetic symmetry is obtained because the magnetic resistances of the iron path from one axial end face of said magnet via the associated rotor teeth to the other axial end face can be made equal to each other.

By arranging the plastic bodies 21 and 16 partly between the teeth 22 and 17, respectively a correct centering is obtained and special mounting plates are not necessary. This also reduces the number of motor parts. If this construction is not used the sector teeth 22 and 17 may have axial dimensions which are not larger than the axial height of the associated rotor teeth 10 and 7. In this respect it is to be noted that it is advantageous if one set of every set of stator teeth and the associated set of rotor teeth extends further than the other set, so that a small axial displacement of the rotor relative to the stator does not affect the effective tooth area.

It is to be noted that in an application, Ser. No. 672,021 filed by one of the inventors herein simultaneously with the present application, in order to reduce the axial height of motors of the type described here, it is proposed to replace the two sets of teeth of each rotor section by one set of teeth, and to arrange the associated stator teeth opposite this one set by arranging said stator teeth in alternate sectors viewed in the circumferential direction. The various tooth offsets described with reference to the accompanying drawings may also be applied to such a motor within the scope of the present invention.

What is claimed is:

1. An electric motor, comprising:
   two coaxial stator sections which are magnetically interconnected, each section having two sets of coaxially arranged stator teeth, at least one coaxial annular coil, and a magnetically conductive circuit extending between the respective sets of stator teeth of said section, and
   a rotor, mounted for rotation coaxially within said stator sections about an axis, and comprising two axially spaced coaxial rotor sections having an axially magnetized permanent magnet disposed therebetween, each rotor section having an outer circumference having a plurality of rotor teeth spaced by air gaps from the stator teeth of a respective stator section,
   each rotor section and respective stator section further comprising magnetically conductive members forming a magnetically conductive circuit which surrounds the respective at least one annular coil and includes the air gaps between the respecive rotor teeth and stator teeth of that rotor and stator section,
   characterized in that a respective one of the two sets of stator teeth of each of the two stator sections are axially adjacent and have their teeth aligned axactly in line with each other, the other set of stator teeth of each respective section has its teeth offset one-half tooth pitch from said one sets, whereby said other sets of stator teeth are aligned with each other, the rotor teeth of a respective rotor section, spaced by air gaps from a corresponding stator section, are aligned with each other, and the teeth of one rotor section are offset one quarter tooth pitch with respect to the teeth of the other rotor section.

2. A motor as claimed in claim 1, characterized in that said axially adjacent sets of respective stator teeth of the two stator sections are formed by one common set of stator teeth extending between the two rotor sections without axial clearance between the teeth of the two axial adjacent sets, and said other set of stator teeth of each respective section is a respective outer set.

3. A motor as claimed in claim 2, characterized in that said axially adjacent sets of a sector teeth are formed in a single one-piece magnetic part.

4. A motor as claimed in claim 3, characterized in that the teeth of each respective rotor section are formed in a single one-piece magnetic part.

5. A motor as claimed in claim 2, characterized in that the teeth of each respective rotor section are formed in a single one-piece magnetic part.

6. A motor as claimed in claim 5, characterized in that the two rotor sections have sides facing each other, formed with respective recesses which receive said permanent magnet.

7. A motor as claimed in claim 6, characterized in that the outer sets of stator teeth are arranged on respective magnetic parts which bound the stator axially, and have respective inner circumferences formed with substantially cylindrical inner surfaces on which said outer sets of stator teeth are arranged, said inner surfaces projecting axially beyond the respective rotor sections, and the motor comprises bearings by which said rotor is journalled within said projecting inner surfaces.

8. A motor as claimed in claim 5, characterized in that the outer sets of stator teeth are arranged on respective magnetic parts which bound the stator axially, and have respective inner circumferences formed with substantially cylindrical inner surfaces on which said outer sets of stator teeth are arranged, said inner surfaces projecting axially beyond the respective rotor sections, and the motor comprises bearings by which said rotor is journalled within said projecting inner surfaces.

9. A motor as claimed in claim 4, characterized in that the outer sets of stator teeth are arranged on respective magnetic parts which bound the stator axially, and have respective inner circumferences formed with substantially cylindrical inner surfaces on which said outer sets of stator teeth are arranged, said inner surfaces projecting axially beyond the respective rotor sections, and the motor comprises bearings by which said rotor is journalled within said projecting inner surfaces.

10. A motor as claimed in claim 3, characterized in that the outer sets of stator teeth are arranged on respective magnetic parts which bound the stator axially, and have respective inner circumferences formed with substantially cylindrical inner surfaces on which said outer sets of stator teeth are arranged, said inner surfaces projecting axially beyond the respective rotor sections, and the motor comprises bearings by which said rotor is journalled within said projecting inner surfaces.

11. A motor as claimed in claim 2, characterized in that the outer sets of stator teeth are arranged on respective magnetic parts which bound the stator axially, and have respective inner circumferences formed with substantially cylindrical inner surfaces on which said outer sets of stator teeth are arranged, said inner surfaces projecting axially beyond the respective rotor sections, and the motor comprises bearings by which said rotor is journalled within said projecting inner surfaces.

12. An electric motor, comprising:

two coaxial stator sections which are magnetically interconnected, each section having two sets of coaxially arranged stator teeth, at least one coaxial annular coil, and a magnetically conductive circuit extending between the respective sets of stator teeth of said section, and a rotor, mounted for rotation coaxially within said stator sections about an axis, and comprising two axially spaced coaxial rotor sections having an axially magnetized permanent magnet disposed therebetween, each rotor section having an outer circumference having a plurality of rotor teeth spaced by air gaps from the stator teeth of a respective stator section, the rotor teeth of each rotor section being equally spaced along a circle at the outer circumference of the respective section, each rotor section and respective stator section further comprising magnetically conductive members forming a magnetically conductive circuit which surrounds the respective at least one annular coil and includes the air gap between the respective rotor teeth and stator teeth of that rotor and stator section, characterized in that a respective one of the two sets of stator teeth of each of the two stator sections are axially adjacent and have their teeth aligned exactly line with each other, the other sets of stator teeth of said respective section has its teeth offset one-half tooth pitch from said one set, and each set of stator teeth of each stator section has a same number of stator teeth, equally spaced along a circle at the inner circumference of the respective stator section, whereby said other sets of stator teeth are aligned with each other; the rotor teeth of a respective rotor section, spaced by air gaps from a corresponding stator section, are aligned with each other, and the teeth of one rotor section are offset one quarter tooth pitch with respect to the teeth of the other rotor section.

13. A motor as claimed in claim 12, characterized in that said axially adjacent sets of respective stator teeth of the two stator sections are formed by one common set of stator teeth extending between the two rotor sections without axial clearance between the teeth of the two axial adjacent sets, and said other set of stator teeth of each respective section is a respective outer set.

14. A motor as claimed in claim 13, characterized in that said axially adjacent sets of stator teeth are formed in a single one-piece magnetic part.

15. A motor as claimed in claim 14, characterized in that the teeth of each respective rotor section are formed in a single one-piece magnetic part.

16. A motor as claimed in claim 12, characterized in that the two rotor sections have sides facing each other, formed with respective recesses which receive said permanent magnet.

17. A motor as claimed in claim 12, characterized in that the outer sets of stator teeth are arranged on respective magnetic parts which bound the stator axially, and have respective inner circumferences formed with substantially cylindrical inner surfaces on which said outer sets of stator teeth are arranged, said inner surfaces projecting axially beyond the respective rotor sections, and the motor comprises bearings by which said rotor is journalled within said projecting inner surfaces.

18. A motor as claimed in claim 17, characterized in that said axially adjacent sets of respective stator teeth of the two stator sections are formed by one common set of stator teeth extending between the two rotor sections without axial clearance between the teeth of the two axial adjacent sets, and said other sets of stator teeth of each respective section is a respective outer set.

19. A motor as claimed in claim 18, characterized in that said axially adjacent sets of stator teeth are formed in a single one-piece magnetic part.

20. An electric motor, comprising:

a rotor comprising a shaft, an axially magnetized cylindrical permanent magnet coaxially mounted on said shaft, and first and second magnetically conductive rotor pieces bounding said magnet and coaxially mounted on said shaft, each rotor piece having a circumferential outer surface with two axially spaced sets of rotor teeth, on each rotor piece the teeth of said two sets being axially aligned, and said rotor pieces being arranged with the teeth of said first rotor piece offset by $\frac{1}{4}$ tooth pitch from the teeth of said second rotor piece, the teeth sets of the two rotor pieces closest to each other defining an inner pair of teeth sets and the two teeth sets axially furthest from each other defining an outer pair of teeth sets;

a stator comprising two annular coils, a center stator piece and two outer stator pieces, said stator pieces being magnetically conductive and circumferentially bounding said rotor with said center stator piece axially aligned with said inner pair of rotor teeth sets, said center stator piece having an outer sleeve portion and an inner cylindrical portion having a single set of stator teeth which extends axially opposite and is radially spaced from said inner pair of rotor teeth sets, each outer stator piece having an annular portion bounding said sleeve portion of said center stator piece and an inner circumferential portion having an inner surface with a set of stator teeth radially spaced from and opposite a respective outer rotor teeth set, the teeth sets of the two outer stator pieces being offset by $\frac{1}{2}$ tooth pitch, and said center stator piece and each outer rotor piece defining an annular gap for receiving a respective annular coil, each rotor piece, the respective outer stator piece, and the respective axial half of said center piece defining a magnetic circuit around each respective annular coil;

a pair of bearings for supporting said rotor for coaxial rotation within said stator; and means for securing each bearing to a respective outer stator piece comprising the inner circumferential portion of each stator piece extending axially outwardly past the respective rotor piece.

21. An electric motor as claimed in claim 20, wherein each rotor piece has a recess for receiving a respective end of said permanent magnet.

22. An electric motor as claimed in claim 21, wherein each rotor piece comprises one set of rotor teeth, each tooth extending the axial length of said rotor piece.

23. An electric motor as claimed in claim 20, wherein each rotor piece comprises one set of rotor teeth, each tooth extending the axial length of said rotor piece.

24. An electric motor as claimed in claim 20, wherein said inner portion of said center stator piece comprises two sets of axially spaced stator teeth, the teeth of said sets being axially aligned.

25. An electric motor as claimed in claim 22, wherein said inner portion of said center stator piece comprises two sets of axially spaced stator teeth, the teeth of said sets being axially aligned.

26. An electric motor as claimed in claim 20, wherein said means for securing each bearing to a respective outer stator piece further comprises a pair of bodies each having a cylindrical portion with an inner surface for receiving a respective bearing and an outer surface for being received against the inner surface of said outwardly extending inner portion of said outer stator piece, and a shoulder for butting against said annular portion of said outer stator pieces.

* * * * *